(12) United States Patent
Kraner et al.

(10) Patent No.: US 9,353,824 B2
(45) Date of Patent: *May 31, 2016

(54) ACTIVE VIBRATION ISOLATION SYSTEM (71) Applicant: Technical Manufacturing Corporation, Peabody, MA (US)

(72) Inventors: Emil Kraner, Swampscott, MA (US); Antonio Lopes, Salem, MA (US)

(73) Assignee: Technical Manufacturing Corporation, Peabody, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/551,490

(22) Filed: Nov. 24, 2014

(65) Prior Publication Data
US 2015/0084249 A1 Mar. 26, 2015

Related U.S. Application Data (63) Continuation of application No. 13/492,225, filed on Jun. 8, 2012, now Pat. No. 8,899,393.

(51) Int. Cl.
*F16F 15/02* (2006.01)
*F16F 15/00* (2006.01)
*G05B 19/404* (2006.01)

(52) U.S. Cl.
CPC ............. *F16F 15/002* (2013.01); *F16F 15/022* (2013.01); *G05B 19/404* (2013.01); *G05B 2219/41191* (2013.01); *G05B 2219/49048* (2013.01); *G05B 2219/49054* (2013.01)

(58) Field of Classification Search
CPC .................... F16F 15/022; G05B 2219/49048
USPC ............... 188/266, 266.7, 378–381; 248/562, 248/566, 576, 618, 621; 267/136, 140.15, 267/562, 140.14
See application file for complete search history.

(56) References Cited

U.S. PATENT DOCUMENTS

| 4,796,873 A | 1/1989 | Schubert |
| 5,265,704 A | 11/1993 | Landesfeind |
| 5,433,422 A | 7/1995 | Ross et al. |

(Continued)

FOREIGN PATENT DOCUMENTS

JP 2005106272 A 4/2005

OTHER PUBLICATIONS

International Search Report corresponding to PCTUS2013043001, dated Sep. 25, 2013.

(Continued)

*Primary Examiner* — Thomas Irvin
(74) *Attorney, Agent, or Firm* — Wolf, Greenfield & Sacks, P.C.

(57) ABSTRACT

An active damping system for use in connection with a vibration isolation system includes an intermediate mass between a base and an isolated payload. The intermediate mass is supported by at least one support element which also supports at least substantially all of the static forces of the isolated payload. An actuator dampens and isolates dynamic forces acting on the intermediate mass from the isolated payload. The active damping system also includes a payload support element and a passive damping element, both of which are coupled at one end to the payload platform and at an opposite end to the intermediate mass. A sensor is affixed to the intermediate mass to generate a feedback signal to a processor coupled to the actuator.

24 Claims, 5 Drawing Sheets

(56) References Cited

U.S. PATENT DOCUMENTS

| | | |
|---|---|---|
| 5,505,282 A | 4/1996 | Olgac |
| 5,660,255 A | 8/1997 | Schubert et al. |
| 5,823,307 A | 10/1998 | Schubert et al. |
| 5,884,736 A | 3/1999 | Burdisso et al. |
| 5,975,508 A | 11/1999 | Beard |
| 6,032,770 A | 3/2000 | Alcone et al. |
| 6,193,206 B1 | 2/2001 | Yasuda et al. |
| 6,354,576 B1 | 3/2002 | Jacobs et al. |
| 6,752,250 B2 | 6/2004 | Tanner |
| 6,808,051 B2 | 10/2004 | Warmerdam |
| 7,571,793 B2 | 8/2009 | Warmerdam et al. |
| 7,665,708 B2 | 2/2010 | Stothers et al. |
| 7,726,452 B2 | 6/2010 | Kraner |
| 7,886,317 B2 | 2/2011 | Chang et al. |
| 2006/0272910 A1 | 12/2006 | Kraner |
| 2007/0273074 A1 | 11/2007 | Mizuno et al. |
| 2009/0180092 A1* | 7/2009 | Butler .................... G03F 7/709 355/67 |
| 2010/0030384 A1 | 2/2010 | Kraner et al. |

OTHER PUBLICATIONS

International Preliminary Report on Patentability corresponding to PCTUS2013043001, dated Dec. 9, 2014.

* cited by examiner

(PRIOR ART)

ACTIVE VIBRATION ISOLATION SYSTEM

CROSS REFERENCE TO RELATED APPLICATIONS

This application is a continuation of U.S. patent application Ser. No. 13/492,225, filed on Jun. 8, 2012, which is incorporated herein by reference in its entirety.

FIELD OF THE INVENTION

The present invention relates to systems for isolating supported payloads from vibrations, and more particularly, to an active vibration isolation system in which at least substantially all of the static force of a payload is supported by passive support elements.

BACKGROUND OF THE INVENTION

Vibration isolation systems suppress vibrations acting on a structure or payload. Passive isolators, such as dampers and absorbers, are mechanical solutions that, while effective, have difficulty suppressing vibrations at low frequencies. Active isolation systems have been developed to suppress vibrations acting on a structure or payload at low frequencies. Generally, active isolation systems measure vibrations at specific locations on a platform bearing a payload and dynamically apply cancellation forces in an equal and opposite direction to suppress the effect of the vibration. The vibrations sensed by these dynamic systems are provided to a processor which activates an actuator that applies the cancellation forces.

Two typical applications for active isolation systems include environments with a high level of ground noise, such that the ground noise affects the operation of an the equipment, and instruments that are very sensitive to small payload vibrations, such as atomic force and scanning tunneling microscopes.

As mentioned above, active isolation systems have the advantage of suppressing vibrations at low frequencies, such as below 2-3 Hz, but tend to be complex. An example of such a system is disclosed in U.S. Pat. No. 5,660,255. To suppress and isolate a payload from vibrations originating from the ground, an actuator is used to cancel the dynamic forces acting on an intermediate mass. In such a system, the actuator is expected to bear all of the weight (i.e., the static force) applied to the top of the actuator, which includes the weight of the intermediate mass, payload platform, passive support elements between the intermediate mass and the platform, as well as the weight of the payload itself. In addition to bearing the static forces, the actuator must generate sufficient forces in response to the movement of the intermediate mass to cancel any dynamic forces acting on the intermediate mass, so that vibrations can be suppressed to an acceptable level.

To provide the dual functional demands of supporting static weight and providing forces needed to isolate the payload from vibration, the actuator generally employed is a piezoelectric stack. This type of actuator can be quite expensive; therefore, to reduce the strain and wear on the actuator, some systems combine the actuator with other passive support elements, such as an offload or support spring, to bear a portion of the static weight. However, as disclosed in U.S. Patent Application Publication No. 2010/0030384, it is generally accepted that the extent to which an offload spring may reduce the burden on the actuator by bearing a portion of the static weight is limited because of the risk that the offload spring would compromise the efficiency of the vibration isolation system. In particular, because the support springs extend from the ground, vibration at frequencies below the resonance frequency of the springs may transfer from the ground through the springs resulting in compromised performance of the active dampening portion of the vibration isolation system.

SUMMARY OF THE INVENTION

Embodiments of the present invention provide an active vibration damping system that includes at least one intermediate mass, which through at least one spring, supports the payload, at least one stiff spring attached to the base or floor, which supports all of the static force of the payload, and an actuator, attached to the base or floor and intermediate mass in parallel to the stiff spring, to isolate dynamic forces caused by ground vibration. Because the actuator employed in the active vibration damping system is essentially limited to isolating the dynamic forces generated on the floor and applied to the payload through the support springs, a relatively small and inexpensive actuator may be used that does not comprise a solid-state piezoelectric actuator, but rather a soft actuator, for example a voice coil motor.

The active vibration damping system, in one embodiment, is positioned between the payload and a source of vibration or dynamic forces, such as the ground, floor, external casing, or a vibrating base, and the active vibration damping system is configured to dampen and isolate the payload from the dynamic forces. The active vibration damping system, in an embodiment, includes an actuator for placement on the ground, floor, external casing, or base. The actuator, by design, can be used to compensate for dynamic forces acting on the system from the ground. The active vibration damping system also includes an intermediate mass between the actuator and the payload. The intermediate mass provides a substantially vibration free stability point to dampen payload dynamic forces without compromising vibration isolation from the ground. The active vibration damping system may further include a support spring between the payload and the intermediate mass in order to support the weight of the payload. In addition, at least one load support spring can be situated between the intermediate mass and the ground to support substantially all of the static force of the payload and intermediate mass. In parallel to the load support spring, between the intermediate mass and the ground, at least one actuator is situated. A sensor can also be affixed to the intermediate mass to generate a feedback signal for processing by a compensation module coupled to the sensor and the actuator. The compensation module responds to the signal from the sensor to dampen and isolate dynamic forces acting on the intermediate mass to keep the payload vibration free.

In a further embodiment, a passive damping element is included in parallel to the support spring, between the payload and the intermediate mass. The passive damping element can act to direct dynamic forces from the payload to the stability point where such forces can be dampened. The support spring, along with the passive damping element, can act to elastically decouple the supported payload from the intermediate mass.

In another embodiment, the active vibration damping system includes a plurality of actuators attached between the intermediate mass and base or ground. Sensors associated with the actuators can be attached to the intermediate mass and the orientation of the actuators, in conjunction with the sensors, is such that the system may dampen vibration from the ground to the intermediate mass along two or three axes.

In a further embodiment, the active vibration damping systems may be combined with a payload platform to provide an active vibration cancellation system. In yet another embodiment, multiple active vibration cancellation systems are coupled with struts to provide a vibration cancellation assembly.

BRIEF DESCRIPTION OF DRAWINGS

The accompanying drawings, in which like reference numerals refer to like features, illustrate embodiments of the invention and, together with the detailed description of the embodiments given below, serve to explain the principles of embodiments of the invention.

DETAILED DESCRIPTION OF THE INVENTION

Figure 1:
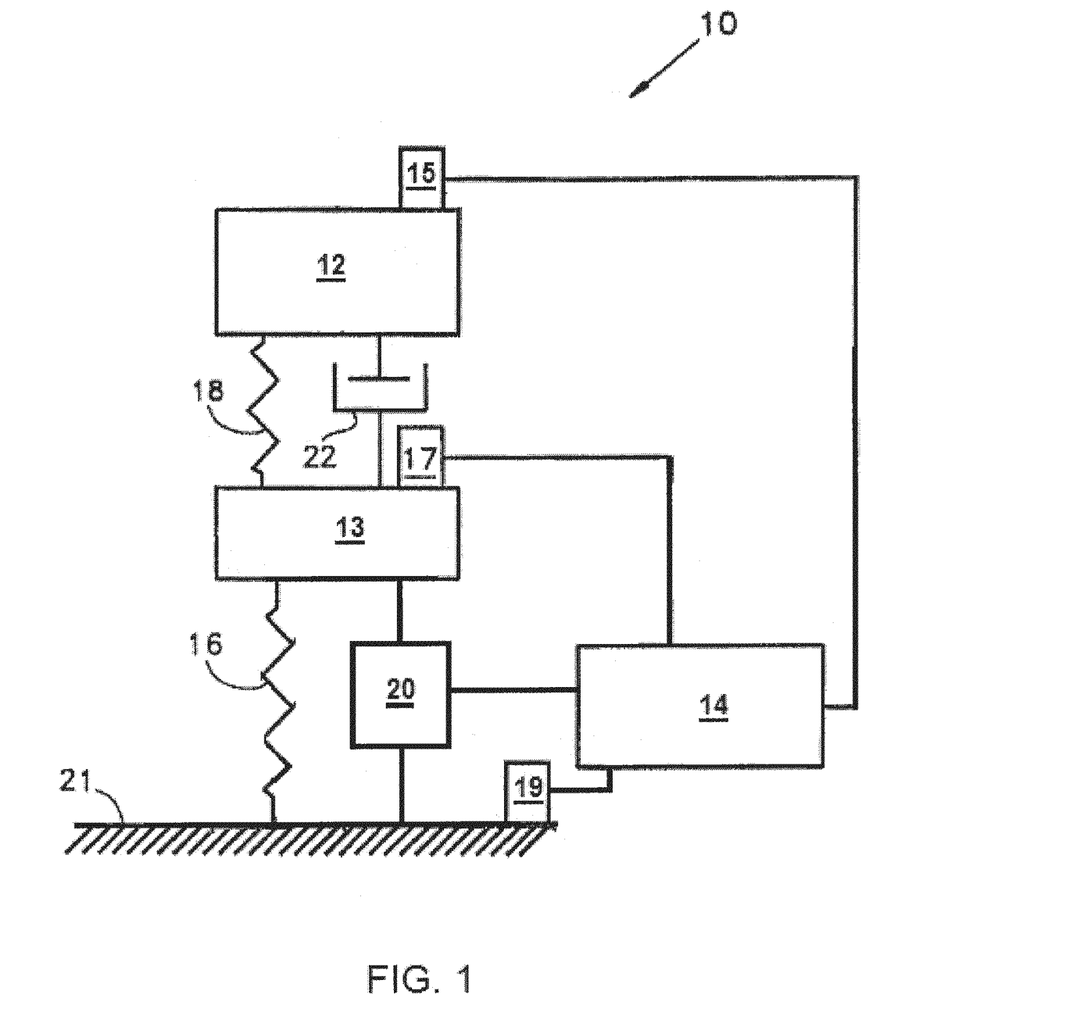
FIG. 1 is a schematic diagram illustrating an active damping system in accordance with embodiments of the present invention.

FIG. 1 illustrates an active vibration isolation system 10 according to one embodiment of the present invention. Active damping system 10 is positioned between an isolated payload 12 (i.e., isolated payload platform or the payload supported thereon or the combination of the two) and a base 21 (e.g., a source of vibration, such as the floor or external casing) to suppress and isolate vibration and other dynamic forces from being transmitted to the payload 12. It should be appreciated that FIG. 1 illustrates a system which addresses active or dynamic vibration isolation in one of three axes. This simplification has been made for the ease of explanation. However, it should be understood that system 10 is capable of being utilized to permit active vibration isolation up to all six degrees of freedom.

As used throughout the specification and in the claims with reference to a support element, to support "at least substantially all of the static force" of the payload means that the element is configured to support at least 70% to 100% of the weight of the isolated payload; "to isolate dynamic forces from the payload" means to reduce the effect of external vibrations on the payload to, or below, a level determined to not adversely affect the operation of any equipment included in the payload; "spring rate" means the force exerted on a spring divided by the change in deflection of the spring; and a "soft actuator" is an actuator having a stiffness of zero.

The active damping system, positioned between the isolated payload 12 and a source of vibration or dynamic forces present at the base 21, such as the ground, floor, or external casing, and which can act to dampen and isolate dynamic forces from the payload 12 includes an active damping actuator 20 that may be coupled to the vibrating base platform 21, an intermediate mass 13 supported by at least one intermediate mass support element 16, a passive damping element 22 for damping dynamic forces (i.e., vibration) from the payload 12, and at least one payload support element 18 situated between the isolated payload 12 and the intermediate mass 13 for supporting the static forces (i.e., weight) of the isolated payload 12. The support elements 16, 18 may be in the form of a spring, wherein the intermediate mass support element stiffness is at least five times greater than the stiffness of the payload support element. The intermediate mass support element 16 is designed to support the static weight exerted by the isolated payload 12 that otherwise would directly act on the active damping actuator 20. As described in further detail below, the intermediate mass support element(s) 16 support substantially at least all of the static force of the isolated payload 12.

The active damping system includes a motion sensor 17 attached to the intermediate mass 13 and coupled to a compensation module 14, such that signals generated from motion of the intermediate mass 13 can be compensated as part of an active feedback compensation loop to provide stability to the intermediate mass 13 over a predetermined range of vibration frequencies. A payload sensor 15 and/or base sensor 19 may also be attached to the isolated payload 12 or the vibrating base platform 21, respectively.

The active damping system 10 may optionally include a spring (not shown) attached, in series, at one end to the isolated payload 12 and attached at an opposite end to the passive damper 22. The spring may have a resonance frequency at least double than that of the payload support element 18 to enhance vibration isolation gain to the system 10 at higher frequencies.

Figure 2:
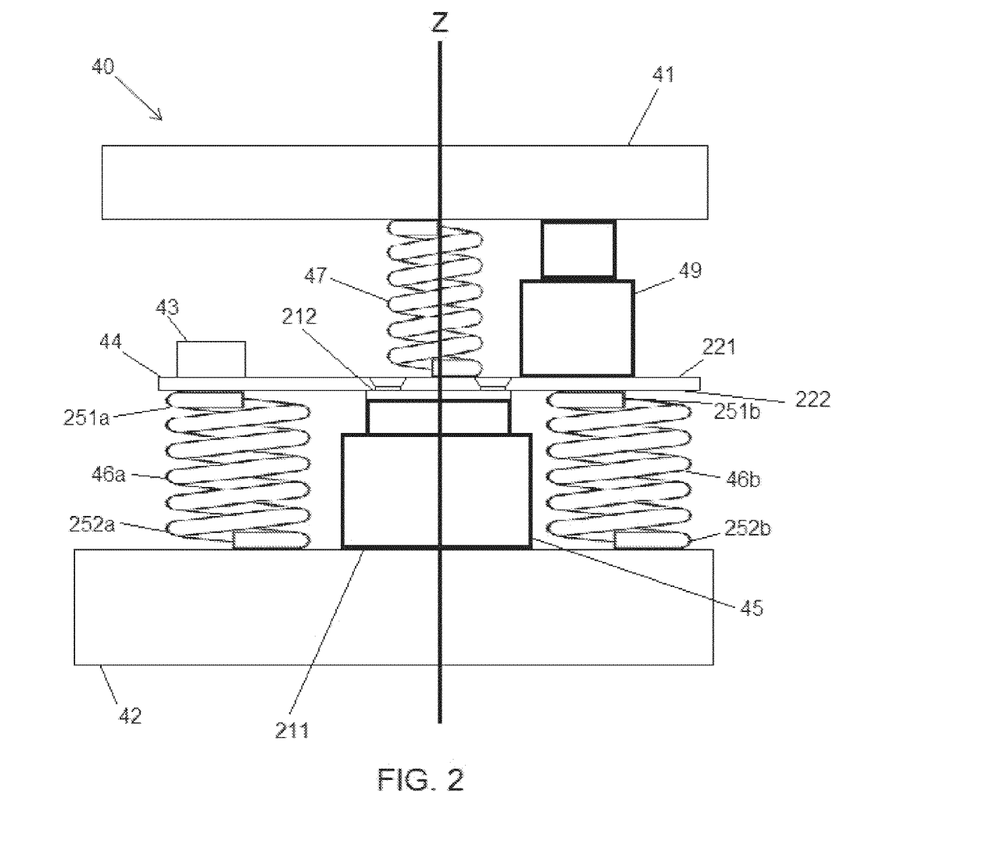
FIG. 2 is a block diagram illustrating an active vibration cancellation system in accordance with embodiments of the present invention.

With reference now to FIG. 2, there is shown an active vibration cancellation system 40 according to another embodiment of the present invention. Active vibration cancellation system 40 can be used, in one aspect, to isolate and dampen vibration and other dynamic forces, created by external forces or components of system 40, from being transferred to a payload 41. The active vibration cancellation system 40, as illustrated, includes the payload 41 (i.e., isolated payload platform, the supported payload thereon, or a combination of the two), an active damping actuator 45, positioned on a base platform 42, and an intermediate mass 44 supported by multiple intermediate mass support elements (46a and 46b) in the form of load support springs. The intermediate mass 44 acts as a stability point (i.e., vibration-free point). Dynamic forces are also dampened by way of a passive damping element 49. Static forces of the isolated payload supported above the intermediate mass 44 by a payload support element 47 in the form of a spring. As shown in FIG. 2, both the passive damping element 49 and support spring 47 can be coupled at one end to the payload 41 and at an opposite end to the intermediate mass 44 acting as the stability point. The load support springs (46a and 46b) situated between the intermediate mass 44 and the base platform 42 support at least substantially all of the static forces of the payload. A sensor 43 affixed to the intermediate mass 44 generates a signal, which is a function of movement of the intermediate mass 44, so feedback can be provided to the active damping actuator 45 to cancel the effect of any dynamic forces generated by base platform 42 and transmitted through the load support springs (46a and 46b), thereby isolating the payload from the dynamic forces.

Active damping actuator 45, in FIG. 2, includes a bottom surface 211 attached to the vibrating base platform 42. The actuator 45 also includes a top surface 212, which moves in a direction opposite to the direction of dynamic forces generated by the vibrating base platform 42, such that the intermediate mass 44 will remain substantially motionless relative to the vibrating base platform 42. The dynamic forces are approximately cancelled, such that motion of the intermediate mass 44 is preferably at most 0.01 times the amplitude of the oscillations generated by the vibrating base platform 42. The active vibration cancellation system 40 of the present invention is designed to isolate vibration of the base platform 42 from the payload along axis Z, which is the axis along which displacement of the actuator 45 occurs.

The active damping actuator 45 may be an electromagnetic actuator, a mechanical actuator, a pneumatic actuator, or a hydraulic actuator. Because the active damping actuator is essentially limited to compensating for dynamic forces, a less expensive active damping actuator having a design that is not required to bear the static forces of the payload, such as an electromagnetic actuator, may be used.

In the embodiment shown in FIG. 2, the active damping actuator 45 is an electromagnetic actuator, in a form of a voice coil motor, which is a soft actuator. The active damping actuator 45 has a top surface 212 coupled to the intermediate mass 44. The overall height of the active damping actuator 45 is variable along axis "Z." Upon energizing the active damping actuator 45, the top surface 212 is forced in the direction of the intermediate mass 44 forcing the intermediate mass 44 in the vertical direction. De-energizing the active damping actuator 45 allows the top surface 212 to return to its original position. The active damping actuator 45 actuates in response to a control signal and it is preferred that the actuator 45 have sufficient stroke and force to dampen the dynamic forces acting on the intermediate mass 44 generated by the vibrating base platform 42.

Because the active damping actuator 45 is essentially limited to compensating for the dynamic forces applied to the intermediate mass 44, at least substantially all of the static forces generated by the payload is supported by the load support springs (46a and 46b). Therefore, the load support springs are sufficiently stiff along their vertical and lateral axes to bear the static forces of the payload. The stiffness of the load support springs is preferably at least five times greater in stiffness than that of the payload support element 47 between the intermediate mass 44 and the payload 41.

Although illustrated as an electromagnetic actuator in FIG. 2, it should be appreciated that actuator 45 may be any actuator, so long as such an actuator can be used in connection with the active vibration cancellation system 40. For instance, any mechanical, electrical, pneumatic, hydraulic, or any other actuators commercially available or known in the industry can be used. In certain instances it may be desirable to increase the stroke of such an actuator being applied to the payload, especially when less force can be applied by or to the less powerful actuator. The active damping systems shown in FIGS. 1 and 2 include an actuator that supports little to none of the payload static forces; therefore, in these instances amplification is not a primary concern. However, the combination of an amplifier and a less powerful actuator may further reduce the overall costs to the system. Such an amplified actuator, depending on the application, can be adapted to provide more stroke in the presence of less force, or less stroke in the presence of more force, if so desired. In FIG. 2, the active vibration cancellation system 40 is provided with an intermediate mass 44, positioned between the actuator 45 and the isolated payload 41. The intermediate mass 44 is elastically decoupled from the payload 41, by way of payload support element 47 and passive damper 49, to act as an actively isolated point (i.e., vibration-free point) to which dynamic forces from the payload 41 may be dampened, at the same time dynamic forces from ground 42 or other components of the system 40 can be actively compensated by the active damping actuator 45 from being transferred to the payload 41. The intermediate mass 44 may have a mass, which can be at least one order of magnitude or more (e.g., two orders of magnitude) smaller than the range of masses that the system 40 may be designed to support or isolate. The intermediate mass 44, as illustrated in FIG. 2, may be a substantially flat body having an upper surface 221 and a bottom surface 222. The intermediate mass 44 may be positioned with its bottom surface 222 directly on the top end 212 of actuator 45. In certain instances, it may be desirable to secure the position of the intermediate mass 44 over the actuator 45, so as to minimize lateral or radial movement of the intermediate mass 44. To that end, any mechanisms known in the art may be used to substantially secure the intermediate mass 44 to the actuator 45, and to minimize lateral or radial movement of the intermediate mass 44.

At least substantially all of the static forces generated by the mass (i.e., weight) of the isolated payload 41 is supported by the intermediate mass support elements (46a and 46b). As illustrated in FIG. 2, load support springs (46a and 46b) are positioned under the intermediate mass 44 and on each side of the actuator 45, such that the top end (251a and 251b) of each load support spring (46a and 46b) is coupled to the intermediate mass 44, while the bottom end (252a and 252b) of each load support spring (46a and 46b) is positioned on the base platform 42.

Also illustrated in FIG. 2 is a payload support element 47, in the form of a spring, extending between the isolated payload 41 and the intermediate mass 44. The spring 47 supports the isolated payload 41 on the intermediate mass 44.

Although shown with two load support springs (46a and 46b), the present invention contemplates using one or more intermediate mass support elements. For example, if only one load support spring is used, such an load support spring may be positioned circumferentially about the actuator 45 under the intermediate mass 44. In another example, three or more load support springs may be used. These load support springs may be situated in any manner that will permit the load support springs to support at least substantially all of the static force of the isolated payload in a preferably even manner. The intermediate mass support elements may be positioned anywhere adjacent to the actuator and under the intermediate mass. The intermediate mass support elements may be metallic springs, coil springs, die springs, or any other similar springs.

It was previously thought by those of skill in the art that an active damping system having passive support elements that support at least substantially all of the payload static forces would compromise isolation of dynamic forces that may affect the payload. Specifically, the concern was that passive support elements positioned on the vibrating base or ground would allow vibration or dynamic forces from the ground to transfer through the passive support elements to an intermediate mass serving as an isolation point and the actuator would be incapable of preventing the dynamic forces from travelling through a passive damper or payload support elements and ultimately affect the payload. The present invention, surprisingly, is able to utilize rigid passive support elements that support at least substantially all of the payload static forces without compromising the ability of the system to dampen vibration forces.

Referring again to FIG. 1, to actively minimize vibration or dynamic forces from being transferred to the payload, active damping system 10 incorporates a feedback compensation loop. Such a compensation loop, in one embodiment, includes a sensor 17. Sensor 17, as illustrated, is positioned on the intermediate mass 13, and generates a signal which is a function of the velocity or displacement exhibited by the intermediate mass 13. In particular, the feedback signal from sensor 17 may be communicated to a compensation module 14, which can process the signal to actuate the actuator 20 accordingly to dampen dynamic forces. Compensation module 14, in an embodiment, is designed to energize actuator 20 to generate cancelling forces at the vibration frequencies of the intermediate mass 13.

The sensor 17 may be a servo-accelerometer or other known vibration sensor, such as a geophone. The signal from the sensor 17 is proportional to the relative acceleration, or velocity, or position with respect to the "free floating" inertia mass inside or outside of the sensor. The sensor 17 and the related compensation circuits used in connection with the present invention may be similar to those disclosed in U.S. Pat. No. 5,823,307, the contents of which are incorporated fully herein by reference. A single compensation module may be capable of processing signals from multiple sensors and controlling multiple actuators to dampen dynamic forces occurring along any of the three axes previously mentioned.

The resulting feedback signal from sensor 17 is processed by the compensation module 14 to control actuator 20 by energizing or de-energizing the actuator 20 at a frequency in response to dynamic forces acting on the intermediate mass 13 to maintain the intermediate mass 13 as a stability point (i.e., vibration-free point). The intermediate mass 13 allows dampening of any dynamic forces and isolates such forces from being transferred to the payload 12 by way of the passive damper 22 or the payload support element 18. Because the passive damper 22 is situated between the payload and the intermediate mass 13, the passive damper also provides additional means to isolate the payload. For example, the payload support element, may generate high level amplification at a resonance frequency that can compromise the stability of the supported payload. The passive damper suppresses such dynamic forces that may be transmitted through the payload support element acting on or from the payload to the stiff and isolated intermediate mass. As a result, the payload remains substantially free of vibration and other dynamic forces.

The payload support element 18, as shown in FIG. 1, is positioned between the payload 12 and intermediate mass 13 substantially in parallel and spaced relation from the passive damper 22. In addition, payload support element 18 can provide high frequency isolation above natural resonance frequency bandwidth. The payload support element maintains the payload substantially parallel to the intermediate mass. Although FIGS. 1 and 2 illustrate only one payload support element, it should be appreciated that additional support elements may be used depending, for example, on the stiffness of the payload support elements relative to the mass of the isolated payload. Accordingly, two or more support elements may be used, so long as the payload may be maintained substantially parallel to the intermediate mass. The payload support element 18 is preferably about at most one-fifth as stiff than that exhibited by the intermediate mass support element 16, and may be a metallic spring, a coil spring, a die spring, a passive pneumatic spring, a pneumatic spring with active level control, or any other similar springs.

As will be appreciated by those of ordinary skill in the art from the description herein, the individual components of the active damping system may be combined. For example, the passive damper and intermediate mass may be integral with one another, such that both the passive damper and the intermediate mass may be integrated substantially into a single unit as shown in US Pat. Appl. Pub. 2010/0030384, the contents of which are incorporated fully herein by reference.

Referring again to FIG. 1, many of the supported payloads on isolated payload 12 may include moving mechanical components, which can generate forces that cause the payload to vibrate in response. Accordingly, it may be desirable to have the active damping system 10 resist or minimize supported payload movement due to payload-induced forces. To do so, a second motion sensor 15 may be used in connection with the system 10. The sensor 15, which may be an absolute acceleration, velocity or a relative displacement sensor, is mounted on the isolated payload 12. Signals from the payload sensor 15 may be combined and integrated with signals from the sensor 17 on the intermediate mass 13 to subsequently enhance vibration control of the isolated payload 12. The system 10 may also include a third motion sensor 19 mounted on the vibrating base platform 21. A signal from the base sensor 19 may be communicated to module 14, which then processes the signal and uses it as a feed-forward signal to control the extension of the actuator 20 to compensate for the vibrating base motion.

Although illustrated to actively isolate vibration along one axis, i.e., the "Z" axis, the intermediate mass and system of the present invention may be designed to actively isolate vibration along each of the "X", "Y", and "Z" axes. Looking now at FIG. 3, there is shown a high-level electrical schematic diagram illustrating the electrical interconnections between the motion sensors, compensation circuitry and actuators for a three-dimensional vibration damping system. An electronic controller indicated generally at 60 includes compensation circuits 61, 62 and 63. Each of these compensation circuits is similar to that disclosed in U.S. Pat. No. 5,660,255, the contents of which are incorporated herein by reference.

Figure 3:
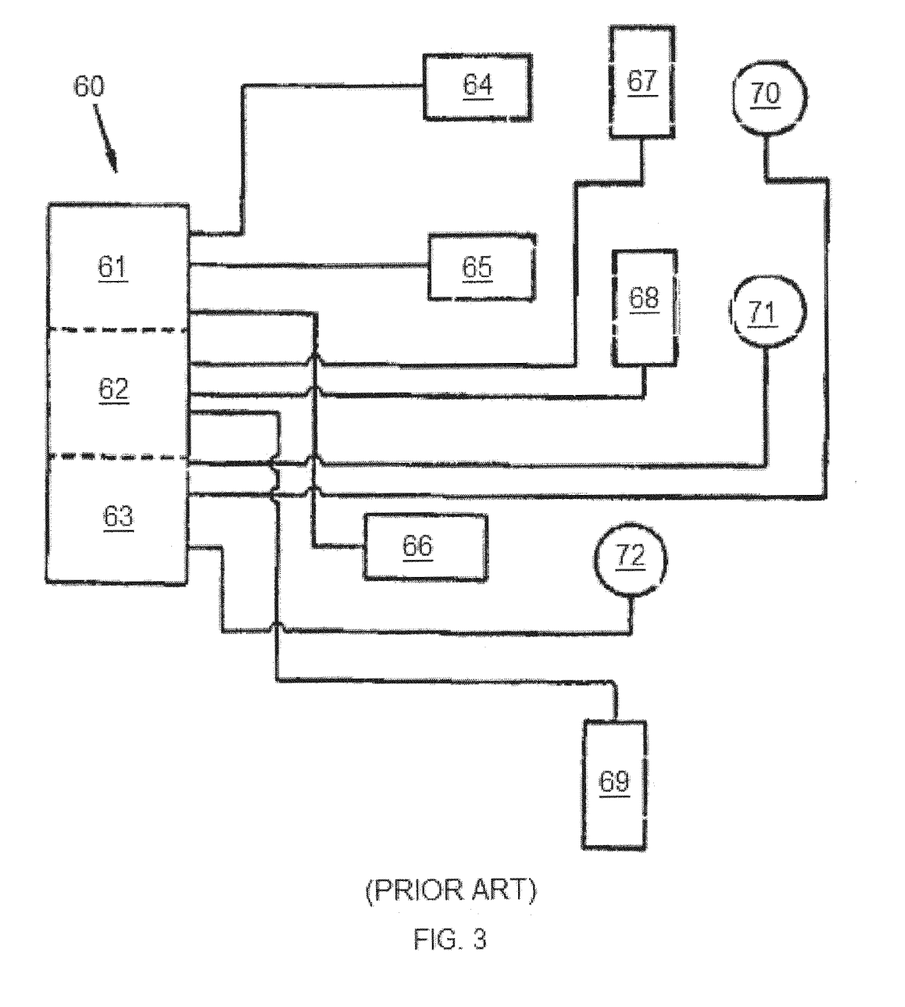
FIG. 3 is an electrical schematic block diagram illustrating the electrical interconnections between motion sensors, compensation circuitry and actuators in accordance with the prior art for use with the systems of FIG. 1 and FIG. 2.

The first compensation circuit 61 receives sensor signals from the "Z" vertical payload sensor 64, which senses motion of the payload along the "Z" axis, and from the "Z" vertical intermediate mass sensor 65, which senses motion of the intermediate mass along the "Z" axis. The signals are processed and a command is transmitted to the actuator 66 to actuate at a specific frequency to dampen the dynamic forces acting on the intermediate mass in the "Z" direction. Compensation circuit 62 and 63 are similarly designed, except that motion is controlled in the "X" and "Y" direction. For example the payload sensor 67 and intermediate mass sensor 68 sensing motion in the "X" direction transmit a signal to the second compensation circuit 62 which controls a second actuator 69 to dampen forces in the "X" direction. Finally, the third compensation circuit 63 receives signals from the payload sensor 70 and intermediate mass sensor 71 generated by motion in the "Y" direction and commands a third actuator 72 to actuate accordingly.

It should be appreciated that the compensation circuitry of the present invention may be implemented in analog or digital form. In addition, such compensation circuitry may be adapted to receive signals from the sensor situated on the vibrating base platform, such as sensor 19 in FIG. 1. Moreover, the compensation circuitry may be employed as a single module capable of receiving motion signals along three axes and compensating for vibrations in each of the six degrees of freedom. Alternatively, a plurality of independent compensation modules may be used to process signals, each module controlling an actuator to dampen vibrations in a single degree or multiple degrees of freedom.

Figure 4:
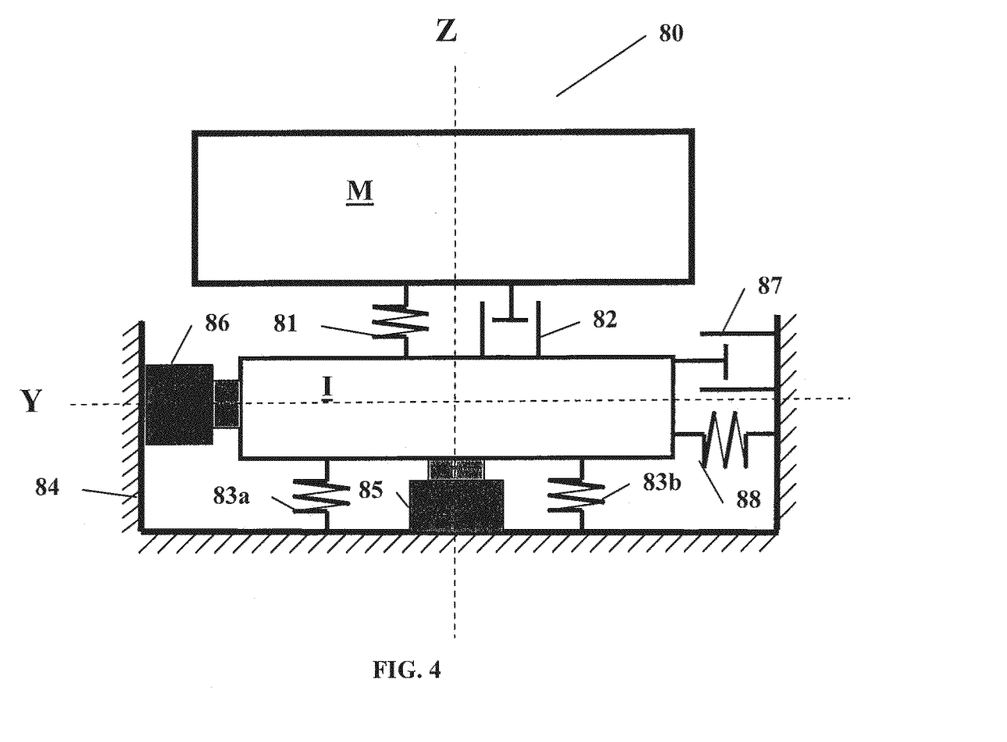
FIG. 4 is a block diagram illustrating an active vibration cancellation system along two axes in accordance with embodiments of the present invention.

Looking now at FIG. 4, another embodiment of the active vibration cancellation system 80 is illustrated which controls vibrations in multiple dimensions. System 80 includes a supported payload M which rests on a spring 81, combined with the passive damper 82, which in turn may be supported by an intermediate mass I. System 80 also provides active vibration isolation in a direction normal to the force exerted by the base 84, i.e., along the "Y" axis. This isolation may be performed using an actuator 86, situated between the intermediate mass I and the vibrating base 84, and oriented to act along the Y-axis. A second actuator 85 is situated between the intermediate mass I and the vibrating base 84, and oriented to act along the Z-axis. The actuators (85 and 86) are electromagnetic actuators in the form of voice coil motors. Also installed adjacent to the vertical actuator 85 are two load support springs (83*a* and 83*b*) which bear at least substantially all of the static forces of the payload M.

A spring element 88 may be installed in the same axis as the radial actuator 86. The spring element 88, as shown in FIG. 4, is disposed between the vibrating base 84 and the intermediate mass I. A damping element 87 may be adjacent to the spring 88 and situated between vibrating base 84 and intermediate mass I. The linear arrangement of radial actuator 86, the spring element 88, and the damping element 87 may be repeated in a direction perpendicular to both the "Y" and "Z" axes, i.e., "X" axis, to achieve vibration isolation in all three axes and, in combination with others similar modules, along six degrees of freedom.

It is preferred that the spring element 88 is designed to have relatively high radial stiffness in the direction normal to the "Y" axis and have relatively low stiffness in all axes perpendicular to the "Y" axis. In this manner, the spring element 88 may allow radial actuator 86 to contract or elongate readily according to the command signal applied to it.

In another embodiment of the invention, a vibration cancellation assembly is provided comprising a plurality of active damping systems as described above coupled by struts. The active damping systems, as previously noted, are installed beneath a payload. To properly balance the payload, as well as provide an assembly which can cancel dynamic forces acting on the payload in any of the six degrees of freedom, it is preferred that the assembly comprise at least three active damping systems, more preferably at least four. Each active damping system within the assembly should be situated and spaced apart underneath the payload, such that the active damping systems are able to isolate essentially the entire payload from dynamic forces generated from the ground.

Figure 5:
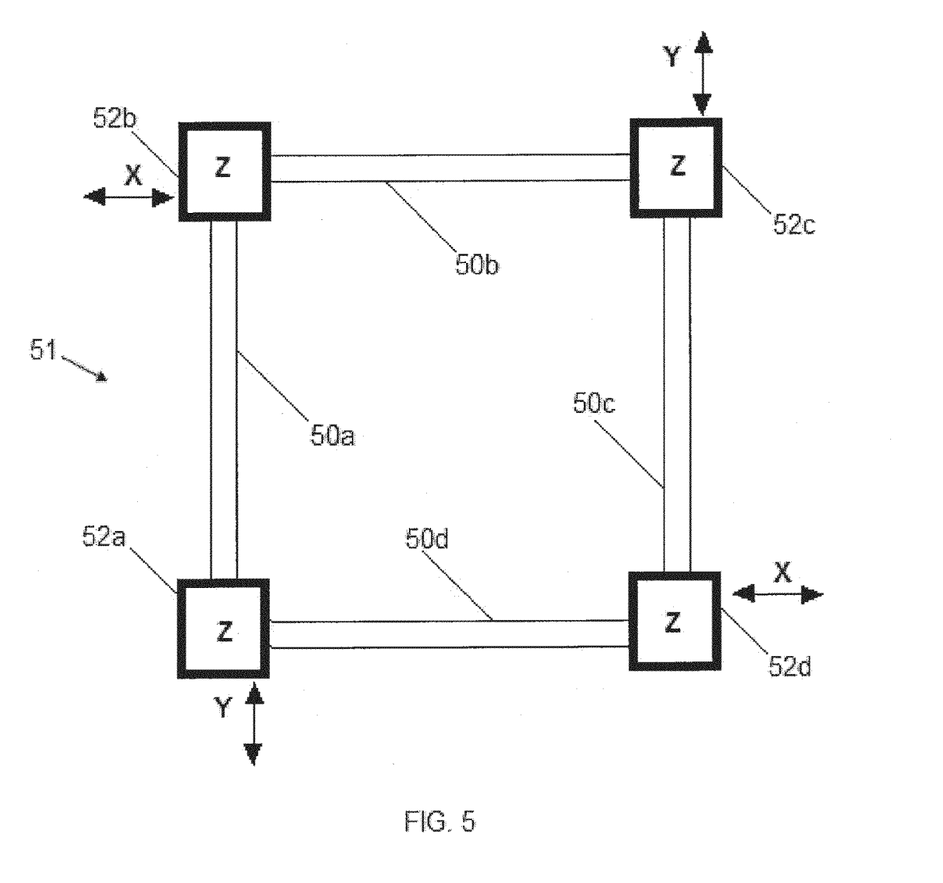
FIG. 5 is a plan view of an active vibration cancellation assembly according to embodiments of the present invention.

The intermediate mass of each system of the present invention is preferably designed to actively isolate vibration along each of the "X", "Y", and "Z" axes; therefore, an active damping system of the present invention would require at least three actuators coupled to the intermediate mass to dampen any dynamic forces along each of the three axes. In that case the combination of three or more systems will provide vibration isolation in all six degrees of freedom. However, a vibration cancellation assembly according to an embodiment of the present invention minimizes the number of actuators needed to isolate payload vibrations along each of the "X" and "Y" axes by incorporating struts coupling each active damping system to at least one other active damping system. Referring to FIG. 5, a plan view is shown of a vibration cancellation assembly having four active damping systems (52*a*, 52*b*, 52*c*, and 52*d*) that include load support elements that together support at least substantially all of the static forces of a payload. Each of the active damping systems is coupled to two other active damping systems by a strut (50*a*, 50*b*, 50*c*, or 50*d*). Opposite ends of each strut is attached to the intermediate mass of adjacent active damping systems within the vibration cancellation assembly; thereby forcing two intermediate masses in each adjacent system (52*a*, 52*b*, 52*c*, and 52*d*) to move in unison along the attached strut. As a result, in this embodiment, only one lateral control servo loop (sensor, compensation module, actuator) is required to control movement in the "X," "Y," and "Z" axes. Each of the active damping systems (52*a*, 52*b*, 52*c*, and 52*d*) would then require an actuator to control the "Z" direction to dampen motion in any of the remaining three degrees of freedom. If the active vibration isolation systems were not connected with struts, each intermediate mass within the three or four systems would each require three actuators to control motion along each axis, totaling nine or twelve actuators for the whole assembly. The embodiment of the invention shown in FIG. 5 reduces the total number of actuators needed in the vibration cancellation assembly to six or eight.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. An active damping system comprising:
   an intermediate mass;
   a payload support having a first spring rate and adapted to couple between an isolated payload and the intermediate mass;
   an intermediate mass support having a second spring rate and adapted to couple between the intermediate mass and a base, wherein the second spring rate is greater than the first spring rate;
   a first active damping actuator having one end coupled to the intermediate mass and an opposite end adapted to couple to the base, wherein the first active damping actuator exhibits a stiffness that is less than a stiffness exhibited by the intermediate mass support;
   a first sensor configured to generate a first signal responsive to movement of the intermediate mass caused by dynamic forces; and
   a compensation module configured to couple to the first sensor and the first active damping actuator, wherein the compensation module is configured to receive the first signal and actuate the first active damping actuator to compensate for the dynamic forces acting on the intermediate mass.

2. The active damping system of claim 1, wherein the payload support comprises one or more springs.

3. The active damping system of claim 2, further comprising a passive damper adapted to couple between the isolated payload and the intermediate mass.

4. The active damping system of claim 3, further comprising a spring coupled to one end of the passive damper.

5. The active damping system of claim 4, wherein a resonance frequency of the spring coupled to one end of the passive damper is at least double a resonance frequency of the payload support.

6. The active damping system of claim 1, wherein the second spring rate is at least five times greater than the first spring rate.

7. The active damping system of claim 1, wherein the stiffness of the first active damping actuator is at least two orders of magnitude less than the stiffness of the intermediate mass support.

8. The active damping system of claim 1, wherein the intermediate mass support is configured to support at least all of the static force of the isolated payload.

9. The active damping system of claim 8, wherein the intermediate mass support comprises one or more springs arranged in parallel with the first active damping actuator.

10. The active damping system of claim 1, wherein the first active damping actuator comprises an electromagnetic actuator.

11. The active damping system of claim 10, wherein the first active damping actuator is arranged in parallel with the intermediate mass support.

12. The active damping system of claim 1, further comprising a platform configured to support at least a portion of the isolated payload, wherein the payload support is coupled between the platform and the intermediate mass.

13. The active damping system of claim 12, further comprising a second sensor connected to the base and configured to generate a second signal responsive to movement of the base caused by dynamic forces acting on the base.

14. The active damping system of claim 12, further comprising a second sensor connected to the platform and configured to generate a second signal responsive to movement of the platform caused by dynamic forces acting on the platform.

15. The active damping system of claim 12, wherein the compensation module is further configured to couple to at least a second sensor and to receive at least a second signal from at least the second sensor and actuate the first active damping actuator, based on signals from the first sensor and at least the second sensor.

16. The active damping system of claim 12, further comprising a base plate and a casing configured to house the intermediate mass, wherein the base plate is attached to the casing.

17. The active damping system of claim 16, further comprising a second active damping actuator connected between the intermediate mass and the casing and oriented in a second direction that is different from a direction of the first active damping actuator.

18. An active vibration cancellation assembly including a plurality of active damping systems, each active damping system comprising:
   an intermediate mass;
   a payload support having a first spring rate and adapted to couple between an isolated payload and the intermediate mass;
   an intermediate mass support having a second spring rate and adapted to couple between the intermediate mass and a base, wherein the second spring rate is greater than the first spring rate;
   an active damping actuator having one end coupled to the intermediate mass and an opposite end adapted to couple to the base, wherein the active damping actuator exhibits a stiffness that is less than a stiffness exhibited by the intermediate mass support;
   a first sensor configured to generate a first signal responsive to movement of the intermediate mass caused by dynamic forces; and
   a compensation module configured to couple to the first sensor and the active damping actuator, wherein the compensation module is configured to receive the first signal and actuate the active damping actuator to compensate for the dynamic forces acting on the intermediate mass.

19. The active vibration cancellation assembly of claim 18, further comprising:
   a platform configured to support the isolated payload, and wherein each active damping system further comprises a base plate and wherein the payload support is coupled between the platform and the intermediate mass.

20. The active vibration cancellation assembly of claim 18, further comprising a first strut connecting the intermediate masses of two of the plurality of active damping systems.

21. The active vibration cancellation assembly of claim 18, further comprising plural struts connecting the intermediate masses of the plurality of active damping systems.

22. The active vibration cancellation assembly of claim 18, where in each active damping system the stiffness of the active damping actuator is at least two orders of magnitude less than the stiffness of the intermediate mass support.

23. The active vibration cancellation assembly of claim 18, where in each active damping system the second spring rate is at least five times greater than the first spring rate.

24. The active vibration cancellation assembly of claim 18, where in each active damping system the active damping actuator comprises an electromagnetic actuator.

\* \* \* \* \*